United States Patent
Park et al.

(10) Patent No.: US 12,269,017 B2
(45) Date of Patent: *Apr. 8, 2025

(54) NICKEL CATALYST FOR HYDROGENATION REACTION AND MANUFACTURING METHOD THEREFOR

(71) Applicant: HANWHA SOLUTIONS CORPORATION, Seoul (KR)

(72) Inventors: Woo Jin Park, Daejeon (KR); Bong Sik Jeon, Daejeon (KR); Yong Hee Lee, Daejeon (KR); Eui Geun Jung, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 671 days.

This patent is subject to a terminal disclaimer.

(21) Appl. No.: 17/623,310

(22) PCT Filed: Jun. 25, 2020

(86) PCT No.: PCT/KR2020/008290
§ 371 (c)(1),
(2) Date: Dec. 28, 2021

(87) PCT Pub. No.: WO2020/262987
PCT Pub. Date: Dec. 30, 2020

(65) Prior Publication Data
US 2022/0370985 A1    Nov. 24, 2022

(30) Foreign Application Priority Data
Jun. 28, 2019 (KR) .................. 10-2019-0078367

(51) Int. Cl.
    B01J 23/755     (2006.01)
    B01J 21/08     (2006.01)
    (Continued)

(52) U.S. Cl.
CPC ............. B01J 23/755 (2013.01); B01J 21/08 (2013.01); B01J 35/393 (2024.01); B01J 35/394 (2024.01);
(Continued)

(58) Field of Classification Search
CPC ...... B01J 23/755; B01J 27/043; B01J 35/394; B01J 35/647; B01J 35/393; B01J 35/615;
(Continued)

(56) References Cited

U.S. PATENT DOCUMENTS 2,513,529 A * 7/1950 Stejskal ................. B01J 23/755
                                                         502/222
6,281,163 B1     8/2001    Van Dijk
(Continued)

FOREIGN PATENT DOCUMENTS

CN        101172237 A      5/2008
CN        102407118 A      4/2012
(Continued)

OTHER PUBLICATIONS

An Official Hearing issued on Oct. 9, 2023 in the corresponding Indian Patent Application.
(Continued)

*Primary Examiner* — Patricia L. Hailey
(74) *Attorney, Agent, or Firm* — Harvest IP Law, LLP

(57) ABSTRACT

The present invention relates to a nickel catalyst for a hydrogenation reaction and a manufacturing method therefor, and relates to a nickel catalyst added in a hydrogenation reaction for improving a color of a hydrocarbon resin. The catalyst according to the present invention has a small crystallite size and improves dispersibility, while having high nickel content, and thus can provide high activity in hydrogenation reactions.

18 Claims, 2 Drawing Sheets

Example 1 Change in Catalyst Particle Size Distribution

(51) Int. Cl.
  *B01J 35/30* (2024.01)
  *B01J 35/40* (2024.01)
  *B01J 35/61* (2024.01)
  *B01J 35/63* (2024.01)
  *B01J 35/64* (2024.01)
  *B01J 37/03* (2006.01)
  *B01J 37/18* (2006.01)
  *C08F 8/04* (2006.01)

(52) U.S. Cl.
  CPC ............ *B01J 35/40* (2024.01); *B01J 35/615* (2024.01); *B01J 35/633* (2024.01); *B01J 35/647* (2024.01); *B01J 37/035* (2013.01); *B01J 37/18* (2013.01); *C08F 8/04* (2013.01)

(58) Field of Classification Search
  CPC . B01J 35/633; B01J 35/40; B01J 21/08; B01J 37/035; B01J 37/18; C08F 8/04
  USPC ................ 502/337, 222, 259; 208/143, 144; 525/338
  See application file for complete search history.

(56) References Cited

U.S. PATENT DOCUMENTS

| | | | |
|---|---|---|---|
| 11,878,286 B2 * | 1/2024 | Park | B01J 37/035 |
| 11,987,659 B2 * | 5/2024 | Jeon | B01J 35/615 |
| 11,999,911 B2 * | 6/2024 | Park | B01J 35/633 |
| 2009/0318738 A1 * | 12/2009 | Fecant | B01J 23/44 585/269 |
| 2020/0369794 A1 * | 11/2020 | Seo | B01J 21/08 |
| 2022/0362749 A1 * | 11/2022 | Park | B01J 37/088 |

FOREIGN PATENT DOCUMENTS

| | | |
|---|---|---|
| CN | 102451691 A | 5/2012 |
| CN | 104588024 A | 5/2015 |
| EP | 3907001 A1 | 11/2021 |
| FR | 2785833 A1 | 5/2000 |
| JP | 47-005926 | 3/1972 |
| JP | 06-025323 A | 2/1994 |
| JP | 2002-275212 A | 9/2002 |
| JP | 2011-072933 A | 4/2011 |
| JP | 2016-531977 A | 10/2016 |
| KR | 1020020024713 A | 4/2002 |
| KR | 1020050010940 A | 1/2005 |
| KR | 1020090064455 A | 6/2009 |
| KR | 1020130051937 A | 5/2013 |
| KR | 1020160040177 A | 4/2016 |
| KR | 1020170038404 A | 4/2017 |
| WO | 9601691 A1 | 1/1996 |
| WO | WO-2009134843 A1 * | 11/2009 ............. B01J 21/04 |
| WO | 2011002782 A2 | 1/2011 |
| WO | 2017077969 A1 | 5/2017 |
| WO | 2019201618 A1 | 10/2019 |
| WO | 2020141705 A1 | 7/2020 |

OTHER PUBLICATIONS

Hydrogenation of Dicyclopentadiene Resin and Its Monomer over High Efficient CuNi Alloy Catalysts, Zongxuan Bai et al., 2019 Wiley-VCH Verlag Gmbh & Co. KGaA, Weinheim, ChemistrySelect 2019, 4, pp. 6035-6042 DOI: 10.1002/slct.201900476.

Selective hydrogenation of 1,3_pentadiene over mono_ and bimetallic sulfidized Ni(Cu)—S/SiO2 catalysts, Russian Chemical Bulletin, International Edition, vol. 65, No. 12, pp. 2841-2844, Dec. 2016, pp. 2841-2844.

An Office Action issued on Sep. 7, 2023 in the corresponding Chinese Patent Application.

Zhang Jiguang, 'Catalyst Preparation Process Technology', China Petrochemical Press, pp. 1-17 (Dec. 31, 2004).

Extended European Search Report issued on Sep. 22, 2023.

* cited by examiner

NICKEL CATALYST FOR HYDROGENATION REACTION AND MANUFACTURING METHOD THEREFOR

CROSS-REFERENCE TO RELATED APPLICATIONS

This application is a National Stage of International Application No. PCT/KR2020/008290 filed Jun. 25, 2020, claiming priority based on Korean Patent Application No. 10-2019-0078367 filed Jun. 28, 2019.

TECHNICAL FIELD

The present invention relates to a nickel catalyst for a hydrogenation reaction and a manufacturing method therefor, and relates to a catalyst for a hydrogenation reaction added for improving a color of a hydrocarbon resin by including nickel (Ni) as an active ingredient.

BACKGROUND ART

Naphtha cracking is an important process for the production of basic intermediates, for example, lower olefins such as ethylene, propylene, butylene, and butadiene, and aromatic compounds such as benzene, toluene, and xylene, which are widely used in the petrochemical and chemical industries. Thermal cracking or steam pyrolysis is the main type of process that is typically performed for forming these materials in the presence of steam and in the absence of oxygen. A feedstock may include, in addition to naphtha, petroleum gases and distillates such as kerosene and gas oil. In this case, naphtha or the like may be pyrolyzed to produce materials such as C4 fraction including ethylene, propylene, butane, and butadiene, C5 fraction including dicyclopentadiene, isoprene, and piperylene, cracked gasoline (including benzene, toluene, and xylene), cracked kerosene (C9 or more fractions), cracked heavy oil (ethylene bottom oil), and hydrogen gas. Of these materials, hydrocarbon resins may be produced by polymerizing C5 and C9 fractions.

Hydrocarbon resins among the C5 fractions include dicyclopentadiene (DCPD) as a main ingredient and may copolymerize propylene, isoprene, styrene, and the like. However, since hydrocarbon resins include unsaturated bonds in part, hydrocarbon resins have a yellow or orange color and have a peculiar bad smell of hydrocarbon resins. At this time, if a hydrogenation process of adding hydrogen is performed, unsaturated bonds are removed so that the color becomes brighter and the odor peculiar to hydrocarbon resins decreases, resulting in an improvement in quality. In hydrocarbon resins, from which unsaturated bonds are removed, are called water-white resins because they are colorless and transparent, and are distributed as high-quality resins with excellent heat resistance and ultraviolet stability.

In the hydrocarbon resin hydrogenation process, the application of a hydrogenation catalyst is essential. As a hydrogenation catalyst for a hydrocarbon resin, various noble metals such as palladium, platinum, and rhodium or various transition metals such as nickel and cobalt are used as active ingredients, and the form of being supported on silica, alumina, activated carbon, titania, or the like is applicable.

Korean Patent Publication No. 10-2017-0038404 relates to a hydrocarbon resin and a manufacturing method therefor, and more particularly, discloses a hydrocarbon resin with a clear color and low odor, which is manufactured by reacting dicyclopentadiene and an indene-based compound, and a manufacturing method therefor. In above patent limitedly provides a palladium-based catalyst.

Korean Patent Publication No. 10-2005-0010940 discloses a hydrogenation catalyst for a hydrocarbon resin, in which palladium and platinum-supported alumina catalyst are used as a hydrogenation catalyst for a hydrocarbon resin. The hydrogenation catalyst includes a sulfur component having a palladium/platinum ratio of 2.5 to 3.5 (mass ratio) and has high hydrogenation activity and long catalyst life. This also provides palladium and platinum as the hydrogenation catalyst, which are expensive and disadvantageous in terms of cost.

As a nickel-based catalyst, Japanese Patent Publication No. 2002-275212 relates to a method for manufacturing a hydrogenated hydrocarbon resin through a hydrogenation reaction by using a hydrocarbon resin as a hydrogenation catalyst. A catalyst includes nickel and silica alumina. Nickel is included in an amount of 50-65 wt %, a surface area of the catalyst is 300-400 $m^2/g$, and a total specific gravity of the catalyst is 0.22-0.50 $g/cm^3$. However, there are some limitations in that the content of nickel is limited as described above.

A nickel-containing catalyst has an advantage of high activity in a hydrogenation reaction, compared with catalysts including other transition metals. However, in order to secure the activity of the catalyst in the hydrocarbon resin hydrogenation reaction, nickel is preferably included in an amount of at least 40 wt %. In a case in which nickel is supported on a carrier, as the nickel content increases, dispersibility decreases, resulting in an increase in the size of nickel crystals and reducing the activity of the catalyst accordingly. If the nickel content is lowered so as to prevent the above problem, dispersibility is relatively improved, but activity is reduced. Therefore, it is necessary to support a high content of nickel and also maintain a crystal size of nickel at an appropriate level.

On the other hand, the hydrocarbon resin hydrogenation reaction is carried out by dispersing a powdered hydrogenation catalyst in a reactant solution in which a hydrocarbon resin is dissolved, and then rotating it at high speed. Since the catalyst is mixed in the solution, a filter is installed at an outlet of a reactor to separate the product solution and the catalyst. Since the product solution is filtered and separated through a catalyst layer on the filter surface, the filterability of the catalyst is one of the important indicators to determine the stable operation of the process. The filterability of the catalyst is generally determined by the particle size distribution of the catalyst. As the size of the particles increases, the pore volume between the particles increases and thus the filterability increases. In particular, the pore size of the filter separating the catalyst and the product solution is about 1 μm. Therefore, when the proportion of crystal particles having a size of 1 μm or less is high, the pores of the filter are blocked and the filterability is greatly reduced.

In addition, the catalyst in powder form is dispersed in the solution and rotated at high speed. Therefore, as the operating time elapses, the catalyst is pulverized so that the average particle size continues to decrease, and the proportion of catalyst particles having a size of 1 μm or less also increases. Thus, the hydrocarbon resin hydrogenation catalyst must have high filterability for a high-viscosity hydrocarbon resin solution, and must suppress the generation of particles having a size of 1 μm or less even after high-speed pulverization.

Therefore, there is an urgent need to develop a catalyst suitable for a hydrocarbon resin hydrogenation reaction that overcomes the above-mentioned problems.

(Patent Literature 1) Korean Patent Publication No. 10-2017-0038404 (2017 Apr. 7)
(Patent Literature 2) Korean Patent Publication No. 10-2005-0010940 (2005 Jan. 28)
(Patent Literature 3) Japanese Patent Publication No. 2002-275212 (2002 Sep. 25)

DESCRIPTION OF EMBODIMENTS

Technical Problem

The present invention aims to solve the above-described problems.

An object of the present invention is to improve activity of a catalyst for a hydrogenation reaction by improving dispersibility while including a high content of nickel and having a small crystallite size of nickel.

An object of the present invention is to provide a catalyst in which the size distribution of catalyst particles is uniform and crushing of particles is suppressed during high-speed rotation in a hydrogenation reaction.

An object of the present invention is to provide a catalyst with improved filterability for a hydrocarbon resin solutions by suppressing the generation of particles having a size of 1 μm or less in a hydrocarbon resin hydrogenation reaction.

Solution to Problem

In order to achieve the above-described objects of the present invention and achieve the characteristic effects of the present invention described below, the characteristic construction of the present invention is as follows.

According to an embodiment of the present invention, there is provided a catalyst for a hydrogenation reaction, including 0.1-3 parts by weight of at least one promoter selected from sulfur and sulfur oxide and 10-50 parts by weight of a silica carrier as a support, based on 40-80 parts by weight of at least one active ingredient selected from nickel and nickel oxide.

According to an embodiment of the present invention, there may be provided a hydrogenation catalyst for a hydrocarbon resin wherein a particle size distribution of the catalyst has an average particle size ($D_{50}$) of 5-7 μm, a diameter ($D_{10}$) of particles corresponding to the bottom 10% by volume is 2 μm or more, and a diameter ($D_{90}$) of particles corresponding to the top 10% by volume is 15 μm or less.

According to another embodiment of the present invention, there is provided a method for manufacturing a catalyst for a hydrogenation reaction, the method including: (a) preparing a first solution by dissolving 10-50 parts by weight of a silica carrier as a support in a solvent based on 40-80 parts by weight of nickel as an active ingredient; (b) adding the first solution to a precipitation container and heating the first solution to a temperature of 60-100° C. while stirring; (c) preparing a precipitate of the first solution by adding a pH control agent to the precipitation container after the heating; (d) washing and filtering the precipitate and drying the precipitate at 100-200° C. for 5-24 hours to prepare a dried product; and (e) reducing the dried product in a hydrogen atmosphere to prepare a reduced product.

According to the present invention, the method may further include, after the step (d), calcining the dried product prepared before the reduction of the step (e) in an air atmosphere. The step of calcining the dried product in the air atmosphere is not necessarily provided, and those of ordinary skill in the art may appropriately select the step according to necessity. In this case, the temperature is 200-500° C.

According to an embodiment of the present invention, there is provided a hydrogenation method for contacting a hydrocarbon resin with hydrogen in the presence of the catalyst for the hydrogenation reaction manufactured by the above-described manufacturing method.

Advantageous Effects of Disclosure

The present invention has an effect of improving activity of a catalyst for a hydrogenation reaction by improving dispersibility while including a high content of nickel and having a small crystallite size of nickel.

The present invention has an effect of providing a catalyst in which the size distribution of catalyst particles is uniform and crushing of particles is suppressed during high-speed rotation in a hydrogenation reaction.

The present invention has an effect of providing a catalyst with improved filterability for a hydrocarbon resin solutions by suppressing the generation of particles having a size of 1 μm or less in a hydrocarbon resin hydrogenation reaction.

BEST MODE

Figure 1:
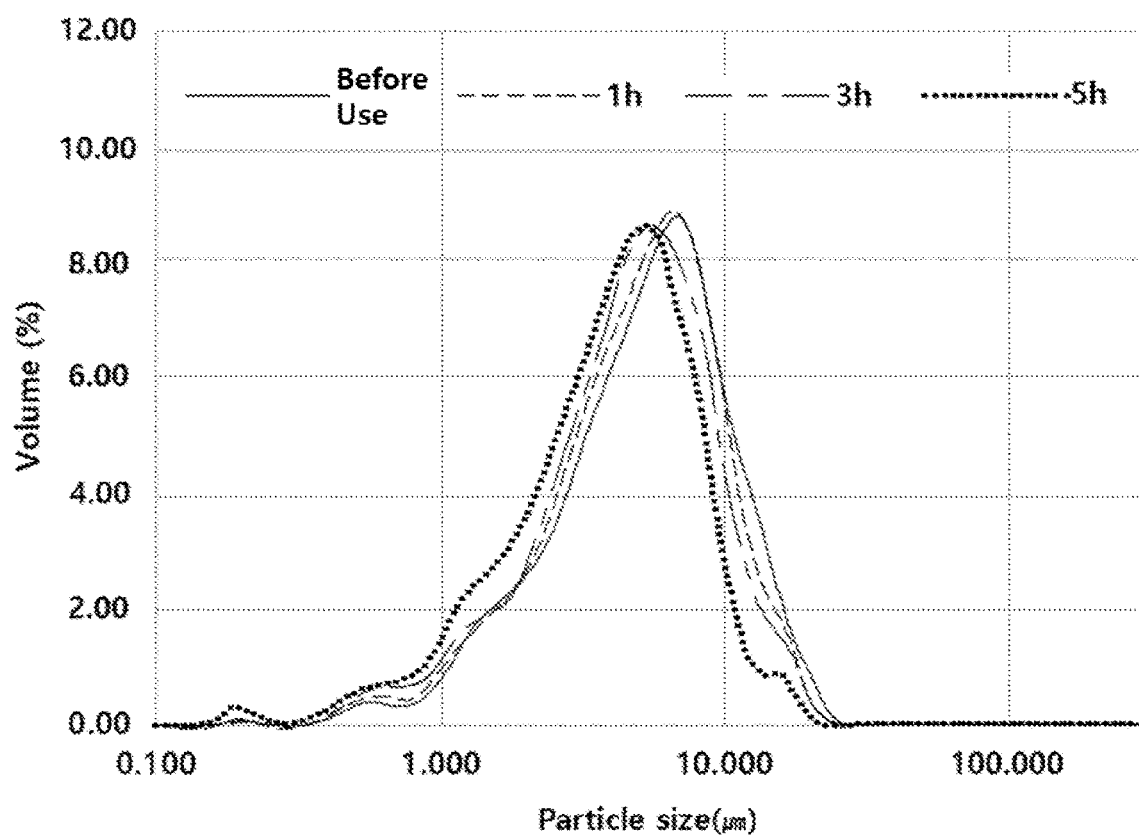
FIG. 1 is a graph obtained by analyzing a particle size distribution of a catalyst according to Example of the present invention.

The present invention will be described with reference to specific embodiments and the accompanying drawings. The embodiments will be described in detail in such a manner that the present invention can be carried out by those of ordinary skill in the art. It should be understood that various embodiments of the present invention are different from each other, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained.

Hereinafter, embodiments of the present invention will be described with reference to the accompanying drawings, so that those of ordinary skill in the art can easily carry out the present invention.

The present invention provides a nickel catalyst for a hydrogenation reaction in order to improve the quality of a hydrocarbon resin manufactured by polymerization of dicyclopentadiene (DCPD) as a main raw material. The DCPD hydrocarbon resin has a yellow color due to unsaturated bonds remaining after polymerization (unsaturated bonds of olefins and aromatics), has a foul odor, and is easily oxidized in air. In order to improve the quality of the hydrocarbon resin, when the hydrogenation reaction is performed under high temperature and high pressure conditions by using the nickel catalyst, and preferably a nickel powder catalyst, a colorless, odorless, and transparent water-white hydrocarbon resin with improved thermal stability, from which unsaturated bonds are removed, may be manufactured.

In order to achieve these objects, according to an embodiment of the present invention, there is provided a catalyst for a hydrogenation reaction, which includes nickel and silica carrier.

The catalyst for the hydrogenation reaction includes 0.1-3 parts by weight of at least one promoter selected from sulfur and sulfur oxide and 10-50 parts by weight of a silica carrier as a support, based on 40-80 parts by weight of at least one active ingredient selected from nickel and nickel oxide. When the content of nickel and nickel oxide is less than the above range, the catalyst activity may be lowered, and when the content of nickel and nickel oxide is greater than the above range, the dispersibility may be deteriorated and the catalyst activity may be lowered.

In addition, by supporting sulfur together with nickel in the above range as a promoter, the hydrogenation performance can be greatly improved by greatly increasing the rate of aromatic hydrogenation relative to olefins in a hydrogenation reaction of an unsaturated hydrocarbon compound including an aromatic group. When the remaining sulfur and sulfur oxide exceed 3 parts by weight, there is a disadvantage in that the hydrogenation reaction performance is sharply deteriorated.

According to an embodiment of the present invention, the catalyst for the hydrogenation reaction includes 50 parts by weight or more of the active ingredient, and includes 0.1-3.0 parts by weight of the promoter based on 100 parts by weight of the active ingredient. For example, a sulfur oxide/nickel oxide ($SO_3$/NiO) weight ratio may be 0.1 to 3.0.

Therefore, the present invention may provide an effect of improving activity of the catalyst for the hydrogenation reaction by improving dispersibility while including a high content of nickel according to a DP method and having a small crystallite size of nickel.

According to an embodiment of the present invention, the nickel source (precursor) in the hydrogenation catalyst may include, for example, nickel and metal salts such as nitrate, acetate, sulfate, chloride, etc. in the form of nickel or a precursor thereof.

As the sulfur source (precursor), a state of being bonded to sulfur, sulfur oxide, and metal salts such as nitrate, acetate, sulfate, chloride, or a combination thereof may be used, but the present invention is not limited thereto.

These may be prepared by mixing in a solvent, and when a precipitate is used, a component of nickel or sulfur may be deposited on a solid carrier suspended in a solvent. In this case, the carrier is preferably a silica carrier.

That is, the nickel may be supported on the silica carrier by forming the precipitate, and may be provided by a deposition-precipitation (DP) method.

In a deposition-precipitation (DP) method, a metal precursor salt solution and a pH control agent react in a carrier dispersion to form a precipitate, and this is adsorbed and solidified on the surface of the carrier. It was confirmed that the uniformity of the catalyst was incomparable, compared with metal catalysts produced by an existing coprecipitation method and impregnation method. Therefore, when the catalyst is prepared by the DP method using silica having a uniform particle size distribution as the carrier, it is easy to optimize by selecting a carrier having a particle size, size distribution, surface area, pore structure, etc. suitable for the reaction.

According to an embodiment of the present invention, the particle size distribution of the catalyst has an average particle size $D_{10}$ of 2 μm or more, $D_{50}$ of 5-7 μm, and $D_{90}$ of 15 μm or less. When the proportion of a particle size of 1 μm or less, which is less than the above range, increases, the pores of the filter are blocked in the hydrogenation reaction process, and thus the filterability of the catalyst may be reduced and become insufficient. When the proportion is greater than the above range, the activity of the catalyst may be lowered. Therefore, it is possible to improve activity of the catalyst for the hydrogenation reaction by improving dispersibility while including a high content of nickel and having a small crystallite size of nickel.

In general, the pore structure of a solid porous material may be determined by several methods. One of the most widely used methods is a nitrogen isothermal adsorption/desorption method based on the BET theory (Brunauer, Emmett and Teller) for the evaporation (desorption) of adsorbed gases during adsorption and desorption of multilayer gases condensed on solid surfaces. Nitrogen is a common adsorbent for probing micro- and mesoporous regions. From the adsorption and desorption isotherms, the following can be calculated. The BET surface area from adsorption of monolayer nitrogen, the total pore volume taken from the amount of adsorbed nitrogen with P/P0=0.99, and the mean pore diameter may be determined from adsorption or desorption data using a calculation method based on the BET theory or the BJH (Barrett, Joyner and Halenda) theory.

Therefore, in a pore structure analysis of the catalyst using a nitrogen adsorption method, a meso pore size is 4.5 nm or more, and preferably 4.5-8.0 nm. In addition, there is provided a catalyst for a hydrogenation reaction which has a BET specific surface area of 200 $m^2$/g or more and a cumulative BJH adsorption volume of 0.25 $cm^3$/g or more.

According to an embodiment of the present invention, there is provided a catalyst for a hydrogenation reaction, wherein the nickel has an average crystallite size of 3-8 nm. Compared with a catalyst according to a manufacturing method such as an existing coprecipitation method, the catalyst according to the present invention can control the crystal size of nickel to 3-8 nm g according to the DP method and maintain high dispersibility. When the average crystal size of nickel is out of the above range, catalyst activity may be lowered. Therefore, the average crystal size of nickel is preferably provided in the range of 3-8 nm.

According to an embodiment of the present invention, the silica carrier is a porous carrier having a specific surface area of 200-400 $m^2$/g and a pore size of 10-30 nm. Therefore, it is possible to improve activity and catalyst life and it is possible to optimally provide an effect of improving the efficiency of the process of separating the product and the catalyst. In addition, by providing the silica carrier having a uniform particle size distribution, it is possible to provide an effect of suppressing the crushing of the catalyst even during high-speed rotation in the hydrogenation reaction.

According to an embodiment of the present invention, the silica carrier having a particle size, size distribution, surface area, pore structure, etc. suitable for the reaction and the catalyst in the range of the above-described optimized combination are provided. Therefore, the catalyst may provide a nickel reduction degree of 80% or more in the hydrogenation reaction.

In addition, the catalyst for the hydrogenation reaction according to an embodiment of the present invention may hydrogenate the hydrocarbon resin including C5 or C9 hydrocarbon fractions, by-products, and a combination thereof through distillation, pretreatment, and polymerization.

A reactant in the hydrogenation reaction according to an embodiment of the present invention may be a hydrocarbon resin. The hydrocarbon resin may include dicyclopentadiene (DCPD). In addition, the reactant in the hydrogenation reaction may be a hydrocarbon resin including C5 or C9 fractions, or a hydrocarbon resin including DCPD fraction by-products and a combination thereof, and may include cyclic diene and benzene functional groups, but the present invention is not limited thereto.

The catalyst according to the present invention may be in the form of powder, particles, or granules. The catalyst according to the present invention is preferably provided in the form of powder. Therefore, by providing the nickel catalyst in powder form, there is an effect of removing the unsaturated bonds of the hydrocarbon resin to provide a colorless, odorless, and transparent water-white hydrocarbon resin with improved thermal stability.

On the other hand, the present invention provides a method for manufacturing the nickel catalyst for the hydrogenation reaction.

The method for manufacturing the nickel catalyst for the hydrogenation reaction includes the steps of: (a) preparing a first solution by dissolving 10-50 parts by weight of a silica carrier as a support in a solvent based on 40-80 parts by weight of nickel as an active ingredient; (b) adding the first solution to a precipitation container and heating the first solution to a temperature of 60-100° C. while stirring; (c) preparing a precipitate of the first solution by adding a pH control agent to the precipitation container after the heating; (d) washing and filtering the precipitate and drying the precipitate at 100-200° C. for 5-24 hours to prepare a dried product; and (e) reducing the dried product in a hydrogen atmosphere to prepare a reduced product.

In addition, the method may further include, after the step (d), calcining the dried product in an air atmosphere. The calcining step is not necessarily provided, and those of ordinary skill in the art may appropriately select the step according to necessity. In this case, the temperature is 200-500° C.

A temperature of the hydrogen atmosphere in the step (e) may be also 200-500° C. Therefore, the calcining and reducing effects are provided.

Furthermore, the method may further include passivating the reduced product with a nitrogen mixed gas including 0.1-20% oxygen, or passivating the reduced product by immersion in a solution including an organic solvent.

In the case of passivation with the nitrogen mixed gas, % refers to volume %. In addition, in the case of passivation by direct immersion in the solution included in the organic solvent, for example, D40 Exxsol may be used as the organic solvent, and any organic solvent capable of blocking air may be used without limitation.

According to an embodiment of the present invention, the preparing of the precipitate in the step (c) may be performed at pH 7-10. The precipitation of the catalyst precursor may be performed in an environment of pH 7 or higher, and preferably pH 7-9, by the addition of a base or an electrochemical means. In this case, a basic compound may be added for the addition of the base. The basic compound may include sodium carbonate, sodium hydroxide, sodium hydrogen carbonate, ammonia, or a hydrate thereof, and preferably sodium carbonate or a hydrate thereof, but the present invention is not limited thereto.

According to an embodiment of the present invention, the drying in the step (d) is performed at 100-200° C. for 5-24 hours. An effect of removing moisture included in the precipitate in the above range is provided.

According to an embodiment of the present invention, there is provided a hydrogenation method which contacts a hydrocarbon resin with hydrogen in the presence of the nickel catalyst for the hydrogenation reaction manufactured by the above-described manufacturing method.

The hydrocarbon resin may be hydrogenated at a temperature of 100-400° C., and preferably 200-300° C., and at a pressure of 1-200 bar, and preferably 30-100 bar. A hydrogenation time may depend primarily on the temperature, the amount of catalyst, and the degree of hydrogenation.

A hydrogenation reaction may be carried out in various reactors. Preferably, the hydrogenation reaction may be carried out in a continuous stirred tank reactor (CSTR) or a loop reactor. In addition, the optimal activity may be exhibited when a reduction temperature is 200-500° C., and preferably 350-450° C., as described above.

According to an embodiment of the present invention, the hydrocarbon resin that is the reactant in the hydrogenation reaction may include dicyclopentadiene (DCPD). In addition, a hydrocarbon resin including C5 fraction may be provided, and a hydrocarbon resin including C9 fraction may be provided.

Hereinafter, the structure and operation of the present invention will be described in more detail with reference to preferred examples of the present invention. However, these examples are shown by way of illustration and should not be construed as limiting the present invention in any sense.

Since contents not described herein can be sufficiently technically inferred by those of ordinary skill in the art, descriptions thereof will be omitted.

EXAMPLE 1

40 g of a porous silica powder having a surface area of 300 m$^2$/g, a pore size of 21 nm, and an average particle size 7 μm, 491 g of nickel sulfate, 6 g of copper sulfate, and 2,000 ml of distilled water were added to a precipitation container, stirred, and heated to a temperature of 80° C. After the temperature reached 80° C., 1,500 mL of a solution including 262 g of sodium carbonate was all injected within 1 hour by using a syringe pump. After completion of precipitation, a slurry had a pH of 7.6, was washed with about 30 L of distilled water, filtered, and then dried at 100° C. for 12 hours or more by using a drying oven. This was subdivided and calcined at a temperature of 350° C. in an air atmosphere. After this was subdivided again, the catalyst was activated by performing the reduction at a temperature of 350° C. in after hydrogen atmosphere. The activated catalyst was passivated using a nitrogen mixed gas including 1% oxygen to manufacture a hydrogenation catalyst.

Based on the weight of the catalyst, an active ingredient content of a passivated catalyst was measured as 78.2 parts by weight, a weight of a promoter was measured as 0.8 parts by weight, and an average size of nickel crystals was measured as 3.8 nm.

The promoter was included in an amount of 1.02 parts by weight based on 100 parts by weight of the active ingredient of the manufactured catalyst. A BET specific surface area was 253 m$^2$/g, a total pore volume was 0.36 m$^3$/g, and an average pore size was 5.7 nm. A catalyst particle size distribution was $D_{10}$ of 2.8 μm, $D_{50}$ of 5.7 μm, and $D_{90}$ of 10.8 μm. A nickel (Ni) reduction degree analyzed by $H_2$-TPR was 86%.

EXAMPLE 2

A hydrogenation catalyst was manufactured in the same manner as in Example 1, except that a promoter and an active ingredient in the catalyst manufacuring materials were 0.38 parts by weight.

EXAMPLE 3

A hydrogenation catalyst was manufactured in the same manner as in Example 1, except that a promoter/active ingredient in the catalyst manufacturing materials was 1.52 parts by weight.

Table 1 below shows the components in the catalyst compositions of Examples.

TABLE 1

| Classification | Unit | Example 1 | Example 2 | Example 3 |
|---|---|---|---|---|
| Promoter/Active ingredient | parts by weight | 1.02 | 0.38 | 1.52 |
| Active ingredient | parts by weight | 78.2 | 78.7 | 79.1 |
| Promoter | parts by weight | 0.8 | 0.3 | 1.2 |
| $SiO_2$ | parts by weight | 19.4 | 19.2 | 19.0 |
| Ni crystallite size | nm | 3.8 | 3.9 | 3.8 |
| BET specificSurface area | $m^2/g$ | 253 | 255 | 263 |
| Total poreVolume | $cm^3/g$ | 0.36 | 0.36 | 0.38 |
| Mean pore diameter | nm | 5.7 | 5.6 | 5.8 |
| $D_{10}$ | μm | 2.8 | 2.9 | 3.2 |
| $D_{50}$ | μm | 5.7 | 5.9 | 6.0 |
| $D_{90}$ | μm | 10.8 | 11.0 | 10.9 |
| Ni reduction degree | % | 86 | 85 | 84 |

COMPARATIVE EXAMPLE 1

A typical hydrogenation catalyst known to those of ordinary skill in the art was manufactured for a hydrogenation reaction. 80 mL of a solution in which nickel nitrate (150 g/L nickel) and sodium silicate (100 g/L silicon) were dissolved in distilled water was added to a precipitation container, stirred, and heated to a temperature of 80° C. After the temperature reached 80° C., 80 mL of a solution including sodium carbonate (288 g/L) was all injected within 1 hour by using a syringe pump. After completion of precipitation, a slurry was washed with about 15 L of distilled water, filtered, and then dried at 120° C. for 12 hours or more by using a drying oven. After this was subdivided, the catalyst was activated by performing the reduction at a temperature of 350° C. in a hydrogen atmosphere. The activated catalyst was passivated using a nitrogen mixed gas including 1% oxygen to manufacture a hydrogenation catalyst. Based on the weight of the catalyst, an active ingredient (NiO) content of a passivated catalyst was measured as 78.9 parts by weight, and an average size of nickel crystals was measured as 6.2 nm. A BET specific surface area was 245 $m^2/g$, a total pore volume was 0.37 $m^3/g$, and an average pore size was 5.7 nm. A catalyst particle size distribution was $D_{10}$ of 2.5 μm, $D_{50}$ of 5.7 μm, and $D_{90}$ of 10.7 μm. A nickel (Ni) reduction degree analyzed by $H_2$-TPR was 83%.

COMPARATIVE EXAMPLE 2

1,500 mL of a solution including 262 g of sodium carbonate and 7.1 g of sodium sulfide as a precipitant was all injected within 1 hour by using a syringe pump, so that a promoter/active ingredient weight ratio in the catalyst manufacturing materials was 3. After completion of precipitation, a slurry has a pH of 7.8. The other processes such as washing, filtering, and drying were the same as those in Example 1.

Based on the weight of the catalyst, a nickel oxide (NiO) content of a passivated catalyst was measured as 79.4 parts by weight, and an average size of nickel crystals was measured as 3.6 nm. A BET specific surface area was 250 $m^2/g$, a total pore volume was 0.35 $m^3/g$, and an average pore size was 5.6 nm. A catalyst particle size distribution was $D_{10}$ of 2.7 μm, $D_{50}$ of 5.8 μm, and $D_{90}$ of 11.1 μm. A nickel (Ni) reduction degree analyzed by $H_2$-TPR was 86%.

COMPARATIVE EXAMPLE 3

A hydrogenation catalyst was manufactured in the same manner as in Example 1, except that a porous silica powder having an average particle size of 4.3 μm was used as a catalyst manufacturing material.

COMPARATIVE EXAMPLE 4

A hydrogenation catalyst was manufactured in the same manner as in Example 1, except that a porous silica powder having an average particle size of 10.6 μm was used as a catalyst manufacturing material.

Table 2 below shows the components in the catalyst compositions of Comparative Example.

TABLE 2

| Classification | Unit | Comparative Example 1 | Comparative Example 2 | Comparative Example 3 | Comparative Example 4 |
|---|---|---|---|---|---|
| Promoter/Active ingredient | parts by weight | 0 | 3.1 | 0.79 | 0.97 |
| Active ingredient | parts by weight | 78.9 | 79.4 | 79.2 | 78.3 |
| Promoter | parts by weight | 0 | 2.5 | 0.6 | 0.8 |
| $SiO_2$ | parts by weight | 20.1 | 19.3 | 19.1 | 19.4 |
| Ni crystallite size | nm | 6.2 | 3.6 | 3.5 | 3.9 |
| BET specificSurface area | $m^2/g$ | 245 | 250 | 235 | 245 |
| Total pore Volume | $cm^3/g$ | 0.37 | 0.35 | 0.36 | 0.38 |
| Mean pore diameter | nm | 5.7 | 5.6 | 5.7 | 5.5 |
| $D_{10}$ | μm | 2.5 | 2.7 | 1.6 | 4.5 |
| $D_{50}$ | μm | 6.1 | 5.8 | 4.3 | 10.6 |
| $D_{90}$ | μm | 11.3 | 11.1 | 11.7 | 16.7 |
| Ni reduction degree | % | 83 | 86 | 87 | 85 |

EXPERIMENTAL EXAMPLE 1

Catalyst Activity Test

A 300 mL autoclave including a hollow shaft stirrer and having a stirring speed of 1,600 rpm was used. 75 g of a solution in which 30 wt % of a non-hydrogenated hydrocarbon resin was dissolved in Exxsol D40 was hydrogenated at 230° C. by adding 0.5% catalyst based on the mass of the hydrocarbon resin. The activity was compared by measuring the consumption amount of hydrogen for 30 minutes after the start of the reaction, and the consumption amount of hydrogen is shown in Table 3 below.

TABLE 3

| | Consumption amount of hydrogen ($\Delta P$, atm) |
|---|---|
| Example 1 | 18.9 |
| Example 2 | 19.1 |
| Example 3 | 18.5 |
| Comparative Example 1 | 15.1 |

As described in Tables 1 and 2 above, it can be confirmed that, even when a high content of nickel is supported, the nickel crystallite size is relatively small, and thus the hydrogenation activity of the hydrocarbon resin has a higher value than that of Comparative Example 1.

EXPERIMENTAL EXAMPLE 2

Catalyst Activity Test

Comparative Example 2 was hydrogenated as in Experimental Example 1. The activity was compared by measuring the consumption amount of hydrogen for 30 minutes after the start of the reaction, and the consumption amount of hydrogen is shown in Table 4 below.

TABLE 4

| | Consumption amount of hydrogen ($\Delta P$, atm) |
|---|---|
| Example 1 | 18.9 |
| Comparative Example 2 | 6.2 |

Although a high content of nickel is supported and a pore structure and a particle size distribution are similar, the consumption amount of hydrogen in Comparative Example 2 was 6.2 atm, which was lower than that of Example 1. Therefore, it can be confirmed that the hydrogenation reaction is lowered when parts by weight of $SO_3$/NiO is increased.

EXPERIMENTAL EXAMPLE 3

Catalyst Activity Test

A catalyst activity test was performed using catalysts having different average particle sizes. A 300 mL autoclave including a hollow shaft stirrer and having a stirring speed of 1,600 rpm was used. 75 g of a solution in which 30 wt % of a non-hydrogenated hydrocarbon resin was dissolved in Exxsol D40 was hydrogenated at 230° C. and 90 bar by adding 0.5% catalyst based on the mass of the hydrocarbon resin. The activity was compared by measuring the consumption amount of hydrogen for 30 minutes after the start of the reaction, and the consumption amount of hydrogen is shown in Table 5 below.

TABLE 5

| | Consumption amount of hydrogen ($\Delta P$, atm) |
|---|---|
| Example 1 | 18.9 |
| Comparative Example 3 | 19.0 |
| Comparative Example 4 | 15.4 |

When comparing the activities of hydrogenation catalysts manufactured using porous silica powders having different average particle sizes in Experimental Example 3,
there was no difference in the activity of the catalyst up to a certain size as in the results of Comparative Example 3 and Example 1.
However, it was confirmed that
the activity of the catalyst is lowered as the size is increased, as in Comparative Example 4.

EXPERIMENTAL EXAMPLE 4

Test to Confirm Filterability of Catalyst 0.36 g of a catalyst was added to 30 g of a solution in which 60 wt % of a non-hydrogenated hydrocarbon resin was dissolved in Exxsol D40, and was pulverized at 20,000 rpm for 1 hour by using a homogenizer. After the pulverization, a portion of the solution was subdivided and the particle size of the catalyst was measured. The particle size distribution measurement results are shown in Table 6.

TABLE 6

| | Example 1 | | | Comparative Example 1 | |
|---|---|---|---|---|---|
| Item | Before pulverization | After pulverization | Item | Before pulverization | After pulverization |
| $D_{10}(\mu m)$ | 2.8 | 2.1 | $D_{10}(\mu m)$ | 2.5 | 1.3 |
| $D_{50}(\mu m)$ | 5.7 | 5.3 | $D_{50}(\mu m)$ | 6.1 | 3.2 |
| $D_{90}(\mu m)$ | 10.8 | 1.7 | $D_{90}(\mu m)$ | 11.3 | 6.5 |
| Proportion of particles having a size of 1 µm or less (%) | 3.5 | 3.9 | Proportion of particles having a size of 1 µm or less (%) | 3.1 | 7.8 |

Figure 2:
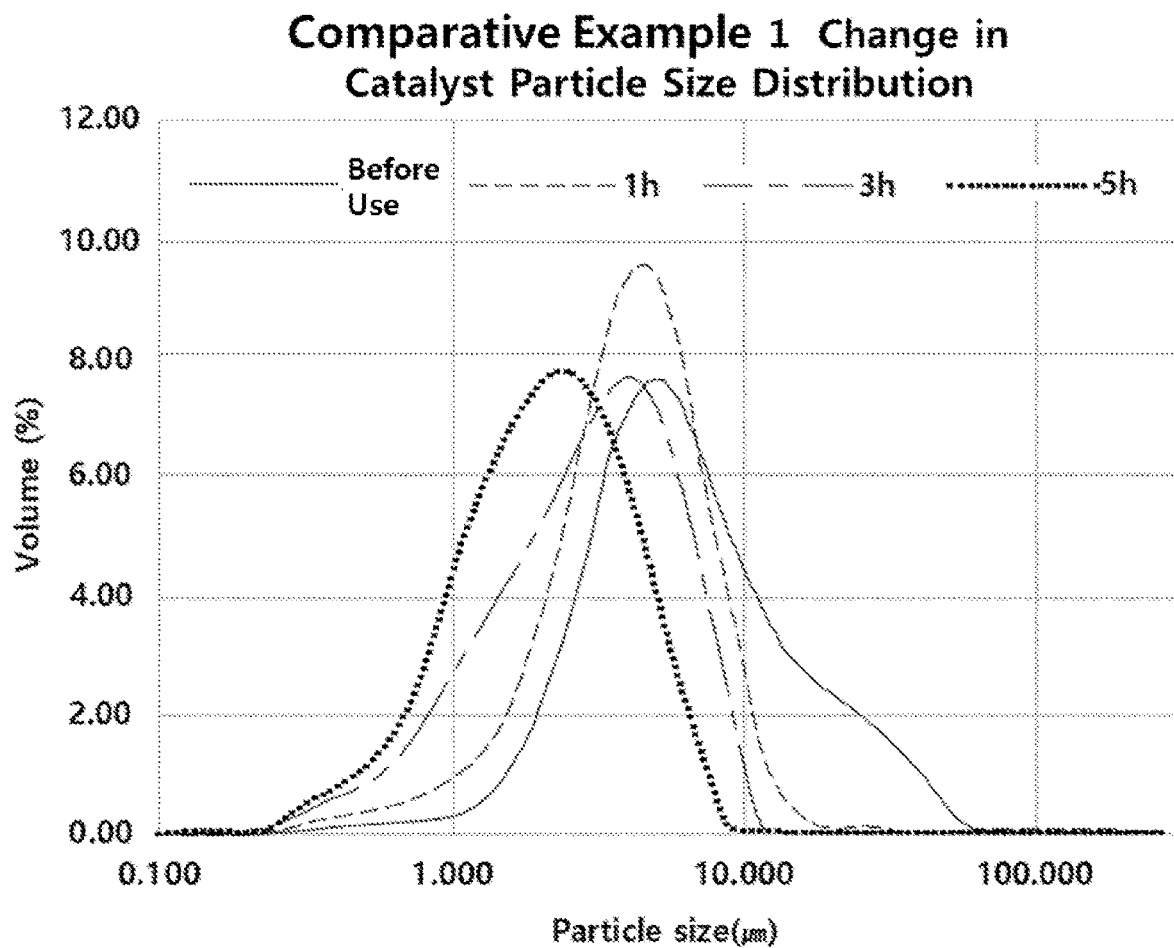
FIG. 2 is a graph obtained by analyzing a particle size distribution of a catalyst according to Comparative Example.

In addition, graphs obtained by analyzing the particle size distributions of the catalysts manufactured in Example 1 and Comparative Example 1 over time at 20,0000 rpm are shown in FIGS. 1 and 2, respectively.

Through the results in Table 6 and FIG. 1, it was confirmed that the crushing of particles was suppressed in Example 1 manufactured by supporting nickel on the silica carrier by the DP method, compared with Comparative Example 1 manufactured by the coprecipitation method.

EXPERIMENTAL EXAMPLE 5

Test to Confirm Filterability of Catalyst

After a filter paper having a pore size of 0.5 µm is fastened to a joint-connected solid suspension filtration device, a pressure in a flask of the filtration device was maintained at 100 mbar by using a vacuum pump. After pulverization of Experimental Example 4, 20 g of the solution was taken and stored in an oven at 100° C. for 10 minutes. Then, the heated solution was poured into the filtration device, and a weight of a hydrocarbon resin solution filtered for 2 minutes was measured. A filtration rate was calculated by dividing the amount of the filtered solution by the time and the area of the filter. The filtration rate measurement results are shown in Table 7.

TABLE 7

| | Before pulverization (g/min · cm$^2$) | After pulverization (g/min · cm$^2$) |
|---|---|---|
| Example 1 | 0.85 | 0.73 |
| Comparative Example 1 | 0.90 | 0.53 |

From the results of Table 7, it was confirmed that, compared with the catalyst manufactured by the coprecipitation method (Comparative Example 1), the filtration rate was faster after the pulverization of the catalyst of Example 1, and the difference in filtration rate before and after pulverization was also small in the case of the catalyst of Example 1.

EXPERIMENTAL EXAMPLE 5

Test to Confirm Filterability of Catalyst

In the same manner as in Experimental Example 4, the catalyst particle size and filterability of Example 1 and Comparative Examples 3 and 4 before crushing were compared and shown in Table 8.

TABLE 8

| Item | Example 1 | Comparative Example 3 | Comparative Example 4 |
|---|---|---|---|
| $D_{10}$(µm) | 2.8 | 1.6 | 4.5 |
| $D_{50}$(µm) | 5.7 | 4.3 | 10.6 |
| $D_{90}$(µm) | 10.8 | 11.7 | 16.7 |
| Filtration rate (g/min · cm$^2$) | 0.85 | 0.64 | 0.91 |

As can be confirmed from Table 8, when the catalyst particle size is small, the filtration rate is low, which may cause difficulties in applying to the process.

From the results of Experimental Examples of Examples and Comparative Examples, it was confirmed that, in the nickel catalyst according to the present invention, the particle size distribution of the catalyst had an average particle size $D_{10}$ of 2 µm or more, $D_{50}$ of 5-7 µm, and $D_{90}$ of 15 µm or less, the size distribution of the catalyst particles was uniform due to the use of the silica carrier having a controlled particle size distribution, crushing of particles was suppressed during high-speed rotation in the hydrogenation reaction, and the filterability was improved in the hydrocarbon resin hydrogenation reaction.

In addition, when the promoter/active ingredient is 2.0 parts by weight or less, it can be confirmed that the activity of the catalyst for the hydrogenation reaction is improved by improving dispersibility while including a high content of nickel and having a small crystallite size of nickel.

In addition, it can be confirmed that a high reduction degree is provided at a low reduction temperature of 300-450° C., compared to an existing DP method.

In addition, it can be confirmed that high activity is provided by including the meso pore diameter size and specific surface area according to the nitrogen adsorption method.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

The invention claimed is:

1. A catalyst for a hydrogenation reaction, comprising: 0.1-3 parts by weight of at least one promoter selected from sulfur and sulfur oxide and 10-50 parts by weight of a silica carrier as a support, based on 40-80 parts by weight of at least one active ingredient selected from nickel and nickel oxide.

2. The catalyst of claim 1, wherein the catalyst comprises 50 parts by weight or more of the active ingredient, and comprises 0.1-3.0 parts by weight of the at least one promoter based on 100 parts by weight of the active ingredient.

3. The catalyst of claim 1, wherein a particle size distribution of the catalyst has an average particle size $D_{10}$ of 2 µm or more, $D_{50}$ of 5-7 µm, and $D_{90}$ of 15 µm or less.

4. The catalyst of claim 1, wherein the catalyst has a meso pore size of 4.5 nm or more in pore structure analysis using a nitrogen adsorption method, a BET specific surface area of 200 m$^2$/g or more, and a cumulative BJH adsorption volume of 0.25 c m$^3$/g or more.

5. The catalyst of claim 1, wherein the nickel has an average crystallite size of 3-8 nm.

6. The catalyst of claim 1, wherein the silica carrier has a specific surface area of 200-400 m$^2$/g and a pore size of 10-30 nm.

7. The catalyst of claim 1, wherein a reactant in the hydrogenation reaction is a hydrocarbon resin.

8. The catalyst of claim 1, wherein a reactant in the hydrogenation reaction is a hydrocarbon resin including at least one selected from a hydrocarbon resin including dicyclopentadiene (DCPD), a hydrocarbon resin including C5 fraction, and a hydrocarbon resin including C9 fraction.

9. The catalyst of claim 1, wherein the catalyst is in at least one form selected from a powder form, a particle form, and a granular form.

10. A method for manufacturing a catalyst for a hydrogenation reaction, the method comprising:

(a) preparing a first solution by dissolving 10-50 parts by weight of a silica carrier as a support in a solvent based on 40-80 parts by weight of nickel as an active ingredient;

(b) adding the first solution to a precipitation container and heating the first solution to a temperature of 60-100° C. while stirring;

(c) preparing a precipitate of the first solution by adding a pH control agent to the precipitation container after the heating;

(d) washing and filtering the precipitate and drying the precipitate at 100-200° C. for 5-24 hours to prepare a dried product; and (e) reducing the dried product in a hydrogen atmosphere to prepare a reduced product.

11. The method of claim 10, further comprising, after the step (d), calcining the dried product in an air atmosphere before the reduced product is prepared.

12. The method of claim 11, wherein a temperature of the air atmosphere is 200-500° C.

13. The method of claim 10, further comprising, after the step (e), passivating the reduced product with a nitrogen mixed gas including 0.1-20% oxygen.

14. The method of claim 10, further comprising, after the step (e), passivating the reduced product by immersing the reduced product into an organic solvent.

15. The method of claim 10, wherein a pH in the step (c) of preparing the precipitate is 7-9.

16. The method of claim 10, wherein a temperature of the hydrogen atmosphere in the step (e) is 200-500° C.

17. A hydrogenation method for contacting a hydrocarbon resin with hydrogen at a temperature of 100-400° C. in the presence of the catalyst for the hydrogenation reaction manufactured by the method of claim 10.

18. The hydrogenation method of claim 17, wherein the hydrocarbon resin comprises at least one selected from a hydrocarbon resin including dicyclopentadiene (DCPD), a hydrocarbon resin including C5 fraction, and a hydrocarbon resin including C9 fraction.

* * * * *